(12) United States Patent
Arseneault et al.

(10) Patent No.: US 8,139,485 B2
(45) Date of Patent: Mar. 20, 2012

(54) LOGICAL TRANSPORT RESOURCE TRAFFIC MANAGEMENT

(75) Inventors: James D. Arseneault, Woodlawn (CA); Chris Barrett, Nepean (CA); Allan Beaudette, Ottawa (CA); Nicholas J. Cadwgan, Ottawa (CA); Pablo Frank, Ottawa (CA); Natalie Giroux, Ottawa (CA); Frederic Perras, Cantley (CA); Brian R. Smith, Ottawa (CA); Kenneth W. Young, Kanata (CA)

(73) Assignee: Ciena Corporation, Linthicum, MD (US)

( * ) Notice: Subject to any disclaimer, the term of this patent is extended or adjusted under 35 U.S.C. 154(b) by 135 days.

(21) Appl. No.: 12/357,878

(22) Filed: Jan. 22, 2009

(65) Prior Publication Data

US 2010/0182904 A1    Jul. 22, 2010

(51) Int. Cl.
*H04L 12/28* (2006.01)
(52) U.S. Cl. ............ 370/230.1; 370/401; 370/409
(58) Field of Classification Search .......... 370/229–235, 370/351, 389–392, 400, 401, 409
See application file for complete search history.

(56) References Cited

U.S. PATENT DOCUMENTS

| | | | |
|---|---|---|---|
| 6,904,286 B1 | 6/2005 | Dantu | |
| 7,724,676 B2 * | 5/2010 | Gerstel et al. | 370/242 |
| 2004/0170179 A1 | 9/2004 | Johansson et al. | |
| 2004/0170186 A1 | 9/2004 | Shao et al. | |
| 2007/0253438 A1 * | 11/2007 | Curry et al. | 370/412 |
| 2008/0049787 A1 * | 2/2008 | McNaughton et al. | 370/468 |
| 2010/0027415 A1 * | 2/2010 | So et al. | 370/225 |

FOREIGN PATENT DOCUMENTS

| | | |
|---|---|---|
| EP | 1124356 A2 | 8/2001 |
| WO | WO 2004057817 A2 | 7/2004 |

* cited by examiner

*Primary Examiner* — Aung S Moe
*Assistant Examiner* — Kerri Rose
(74) *Attorney, Agent, or Firm* — Clements Bernard PLLC; Christopher L. Bernard; Lawrence A. Baratta Jr.

(57) ABSTRACT

A method for managing data packets passing through an Ethernet node having multiple ingress ports and multiple egress ports, the ingress ports receiving the data packets from at least one service, and the egress ports configured with at least one Logical Transport Resource (LTR) configured as a predefined path between one of the egress ports and a destination in the Ethernet network. The method comprises mapping one or more of the services to each of the at least one LTR, shaping each of the at least one LTR to a configured rate, and transmitting data packets to the Ethernet network via the egress ports.

27 Claims, 11 Drawing Sheets

FIG. 5A
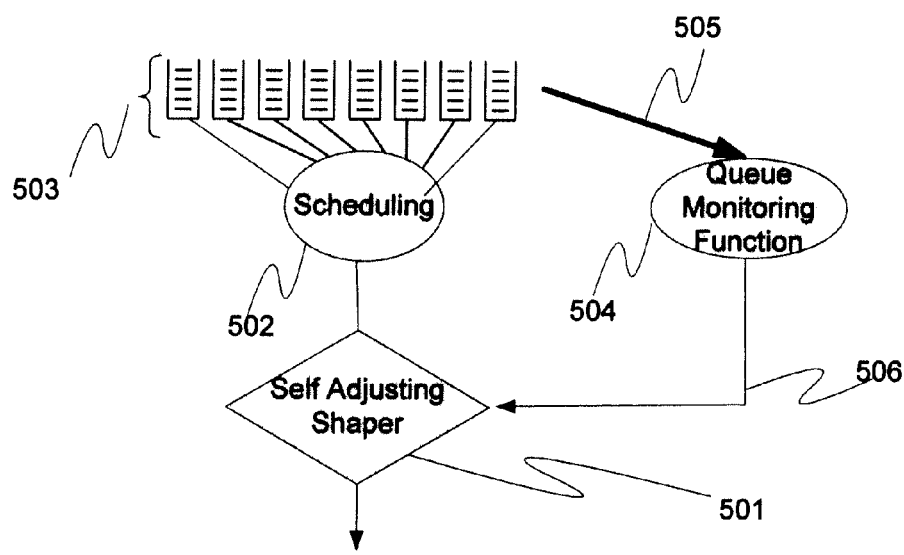
FIG. 5B
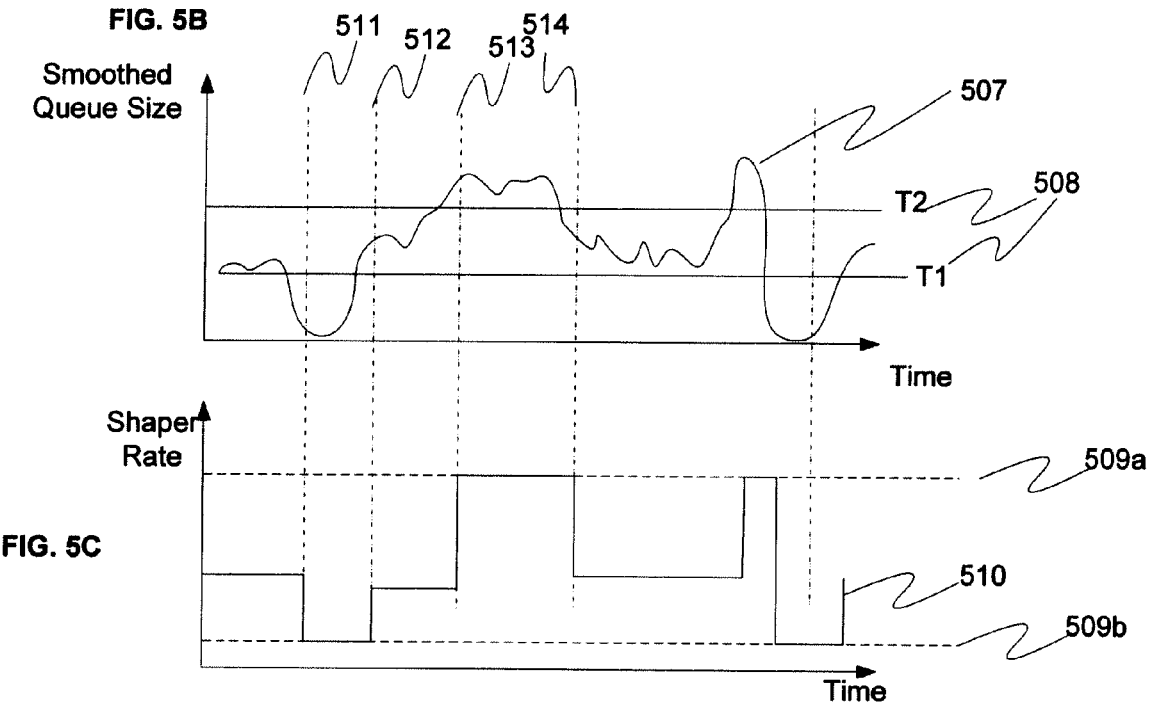
FIG. 5C

LOGICAL TRANSPORT RESOURCE TRAFFIC MANAGEMENT

FIELD OF THE INVENTION

The present invention generally relates to Traffic Management for telecommunication equipment and, in particular, to Carrier Ethernet traffic management.

BACKGROUND OF THE INVENTION

Ethernet technology has been pervasive in the Local Area Networks for many years. Enhancements to the technology to include Operation Administration and Maintenance (OAM) features are now allowing Ethernet to be used in carrier networks. With its advances, Carrier Ethernet technology can be used to build a transport infrastructure to replace a SONET/SDH.

However, even though Carrier Ethernet includes the OAM features required for a carrier to use the technology in the large networks, Ethernet's inherent asynchronous packet-oriented behavior can create bursts of traffic and congestion in the network which can lead to unpredictable non-deterministic performance. Such unpredictable behavior is a deterrent to using the technology in a transport network to replace a synchronous deterministic protocol like SONET, even if it provides significant efficiency improvement. One way to add some determinism to the Carrier Ethernet network is to perform port rate limiting (reducing the rate of an entire port to limit the rate of the bursts) which is a waste of precious bandwidth. Another option is to severely under-book the bandwidth in order to make sure the bursts do not create congestion. Both solutions are highly bandwidth inefficient. There is a need to add functionality to the Carrier Ethernet technology to achieve deterministic performance while not losing the efficiency improvements. There is also a need to adjust the amount of bandwidth as needed by the services to further optimize the resource usage.

SUMMARY OF THE INVENTION

In accordance with one embodiment, a method is provided for managing data packets passing through an Ethernet node having multiple ingress ports and multiple egress ports, the ingress ports receiving the data packets from at least one service, and the egress ports configured with at least one Logical Transport Resource (LTR) configured as a predefined path between one of the egress ports and a destination in the Ethernet network. The method comprises mapping one or more of the services to each of the at least one LTR, shaping each of the at least one LTR to a configured rate, and transmitting data packets to the Ethernet network via the egress ports.

One implementation includes multiple LTRs configured to a selected one of the egress ports, and multiplexing the data packets on the multiple LTRs configured to the same egress port for transmitting data packets from the selected egress port to the destination in the Ethernet network. The multiplexing may provide configurable priority for data packets that are already in the LTRs as compared to traffic newly entering the LTRs. At least two of the LTRs may be associated together, with the shaping configurably directed to one of the associated LTRs at a time. All the associated LTRs may use the same queuing and scheduling. Data packets may be switched from a first of the associated LTRs to a second of the associated LTRs, with scheduling and activating of the second LTR occurring only when no data packets remain queued to the first LTR. The associated LTRs may include a main LTR and a protection LTR, with the protection LTR having a configurably lower rate than the main LTR. The performance of each of the paths of the associated LTRs may be estimated, with a first of the associated LTRs being dynamically switched to a second of the associated LTRs when the performance of the first LTR is degraded compared to the performance of the second LTR, with the first LTR becoming an associated LTR for the second LTR. The first LTR may be the main LTR prior to said dynamic switching, and the second LTR becoming the main LTR after the dynamic switching.

One implementation of the shaping includes queuing the incoming data packets in one of multiple queues associated to the at least one LTR according to a class of service identifier, and scheduling the exiting of the data packets from the queues according to a queue priority at a configured LTR shaping rate. The ingress ports may receive data packets from multiple services, with the scheduling applying priorities for the different classes of service according to a predetermined hierarchy. The scheduling may provide at least one strict priority scheduling in which a preselected class of service has the highest priority.

One implementation dynamically modifies the configured rate on the basis of the load in the LTR being shaped. The LTR may include at least one associated queue, with the configured rate being dynamically modified when the measured size of the associated queue passes a predetermined threshold. The configured rate may be maintained between a configurable minimum and a configurable maximum.

In another implementation, the LTR includes at least one associated queue, and information regarding the load of the queue is provided to a management system so that the rate of the configured rate may be manually adjusted based on the information.

In a further implementation, dynamically modifying the configured rate is dynamically modified on the basis of a time period.

Still another implementation includes multiple LTRs, each of which is configured as a different predefined path between a selected one of the egress ports and a destination in the Ethernet network. Data packets are transmitted from the selected egress port to the destination via different ones of the LTRs in different time periods, and the multiple LTRs are shaped to different configured rates. Each of the different time periods may be at least one time period selected from the group consisting of prescribed portions of a day, prescribed portions of a week, and prescribed days of a year.

In a further implementation, the LTR is shaped to a different configured rate in different time periods. Each of the different time periods may be at least one time period selected from the group consisting of prescribed portions of a day, prescribed portions of a week, and prescribed days of a year.

In a still further implementation, the traffic load on the Ethernet network is estimated based on control messages, and the configured rate is dynamically modified on the basis of the estimated traffic load. The traffic load on the Ethernet network may be estimated by calculating the forward delay in transmitting a control packet between a pair of nodes in the Ethernet network, and calculating a differential between two consecutive forward delay calculations.

Yet another implementation includes queuing the incoming data packets in one of multiple queues associated to the at least one LTR according to a class of service identifier, monitoring the load of the queues, and notifying applications using the service of the status of the monitored load of the queues such that the applications can dynamically adapt their transmission load to the available bandwidth.

BRIEF DESCRIPTION OF THE DRAWINGS

The invention will be better understood from the following description of preferred embodiments together with reference to the accompanying drawings, in which:

FIG. 5A is a diagrammatic illustration of a self-adjusting shaper system.

FIGS. 5B and 5C are exemplary curves of the smoothed queue size and shaper rate in the shaper system of FIG. 5A.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1A:
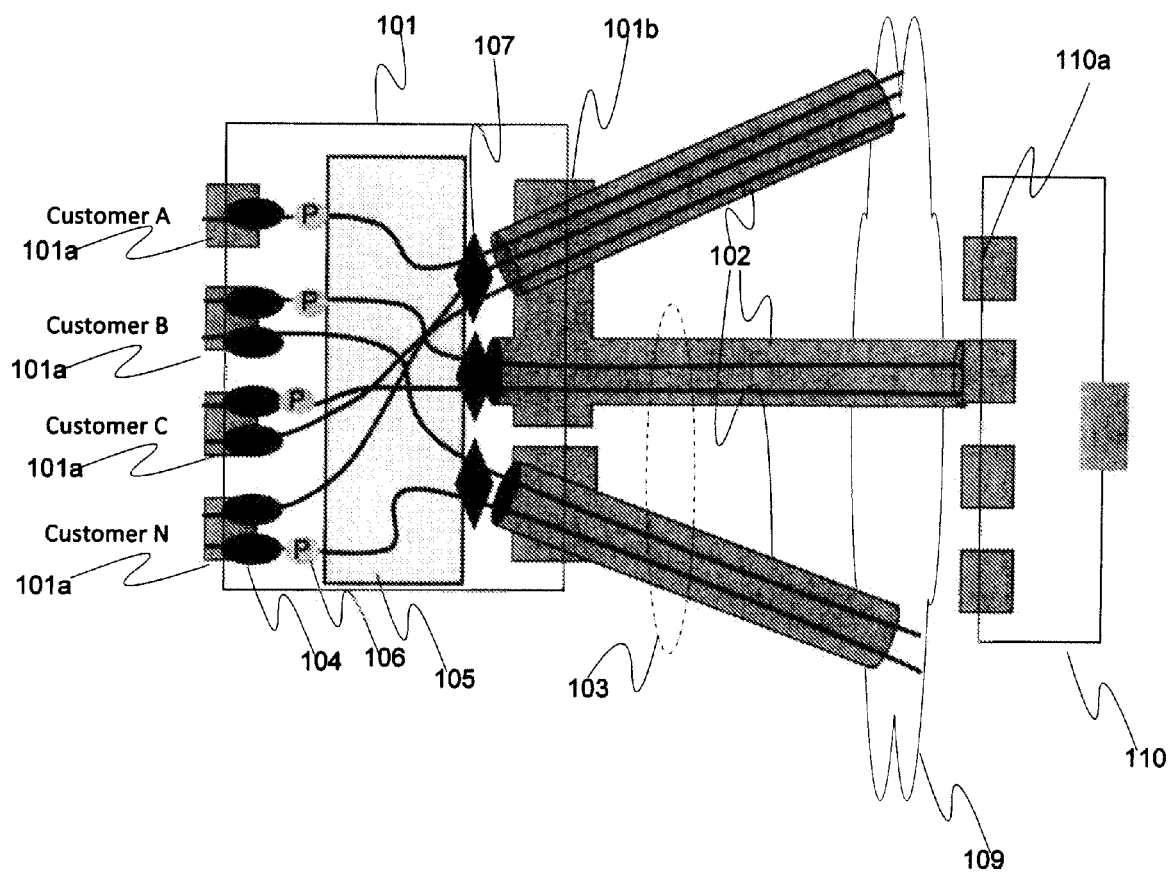
FIG. 1A is a diagrammatic illustration of an Ethernet network and one of its access systems and one of its destination systems.

In order to provide predictable performance in a Carrier Ethernet, the concept of Logical Transport Resource (LTR) is introduced. Referring to FIG. 1A, an Ethernet access system 101 has multiple physical ports. The ports can be used as user-network-interface (UNI) ports 101a, or as egress ports 101b going toward the network. A LTR is a preconfigured path in the network 109 originating from the egress port 101b of an access system 101 and terminating at the ingress port 110a of a destination system 110 in the network 109. Multiple services originating on the access system 101, from any customers, can be mapped to a LTR 102 based on their common destination and other network policies. Each egress port 101b contains one or more LTR 102, each can be configured with a programmable amount of bandwidth. Two or more LTRs can optionally be associated together to form a protection group 103 (following, for example, IEEE 802.1Qay) where protection LTRs are standing by to be the backup of a main LTR.

Services incoming on the UNI ports 101a go through a service identification function 104 and the services are mapped, through a steering function 105, toward an appropriate LTR 102 or protection group 103. The service identification function 104 performs classification based on packet header information, and the service steering function 105 maps the services onto to a preconfigured LTR 102 or protection group 103. The sum of the LTR bandwidth can be less than or equal to the port bandwidth, but in some cases, it is also possible to have the total LTR bandwidth exceed the port bandwidth, to achieve further bandwidth efficiency.

The decoupling of the service identification 104, the service steering function 105 and the LTR 102 functions permits flexible mapping of any service from any port onto any LTR. LTRs can carry services from the same or different Classes-of-Service (CoS).

Optionally the traffic from individual services can be policed using a policing function 106 to ensure that the traffic generated by the service is compliant with the traffic profile contracted with the network. The traffic from the different services is merged onto a LTR 102. The aggregate traffic merged onto the LTR is shaped as an aggregate using a shaping function 107. The shaping function 107 schedules the traffic for the entire LTR, according to the configured LTR bandwidth, to remove any burstiness either generated by one service or resulting from the merging of the traffic from several services. The traffic from the different LTRs is merged together and transmitted onto the egress link 101b onto which the LTR is mapped. Because the traffic from each LTR is shaped and therefore predictably behaved, it is possible to simply engineer paths through the network to route the LTRs (for example using Provider Backbone Bridging-Traffic Engineered PBB-TE), and the network will behave in a predictable and deterministic manner, similar to a synchronous transport network.

Figure 1B:
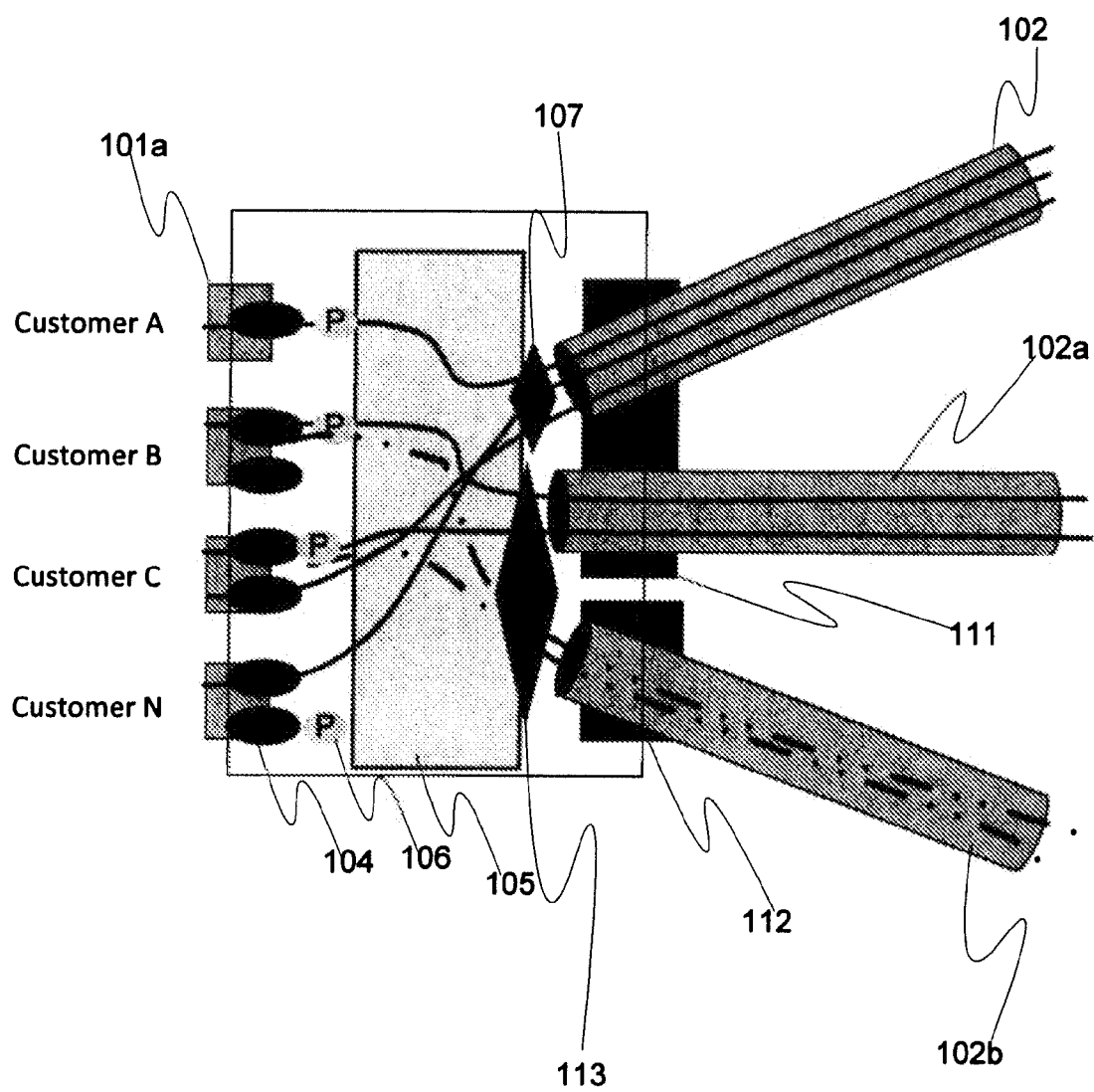
FIG. 1B is a diagrammatic illustration of the access system shown in FIG. 1A and illustrating the switching of traffic flow between the two LTRs in an associated pair.

Referring to FIG. 1B, a main LTR 102a is associated with one or more LTRs 102b. Each of the LTRs 102a and 102b can have a different network path via different output ports 111 and 112, respectively and generally but not necessarily the same destination. The association can be done for protection switching, but also for other purposes described below. In this implementation, a single traffic shaper 113 is used for both the LTRs 102a and 102b. The traffic is queued at a common queuing point to avoid the loss of packets when switching from one LTR to another. The rate of the shaper can be modified when changing to a different LTR, but by using the same queuing structure, the packets awaiting transmission on this LTR group will not be lost and simply re-routed to the other LTR upon switching. If switching from a main LTR 102a to an associated LTR 102b is not done because of failure, and if this common queuing capability is not available, it is also possible to avoid loss during the switch by redirecting the fill of the main LTR queue to the associated LTR queue, but only switching the transmission to the associated LTR 102b when the queues of the main LTR 102a are fully drained. When the main LTR queues are drained, the control is released to the associated LTR shaper 113 which then continues to send the traffic on the associated LTR 102b.

Figure 2:
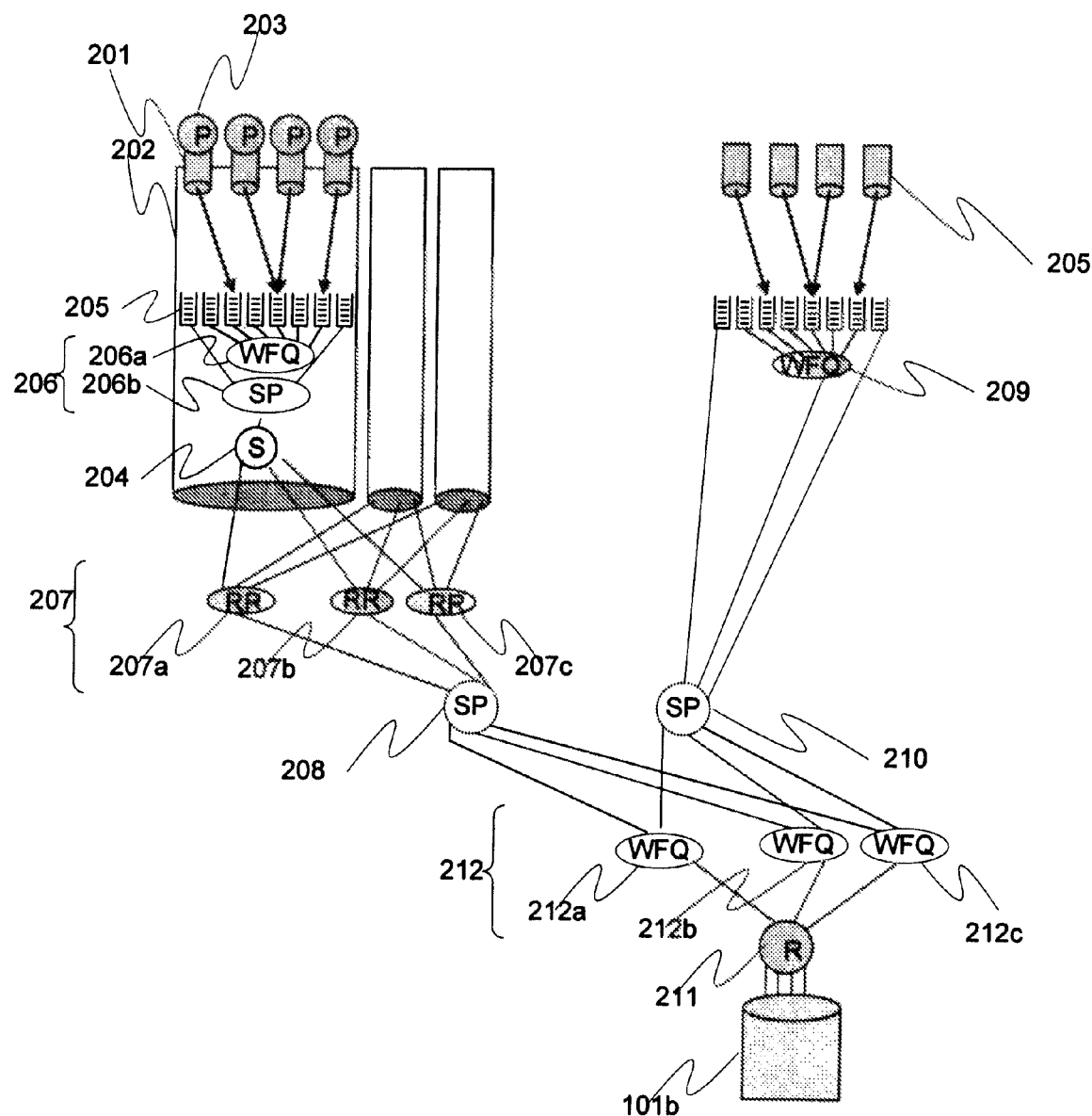
FIG. 2 is a diagrammatic illustration of a system for shaping the flow of traffic incoming from both access and transit LTRs to an egress link.

FIG. 2 depicts one implementation of the shaping function. On the access side, one or more services 201 are mapped to one access LTR 202. As discussed above, a service can be optionally configured to go through a policing function 203. Each access LTR 202a-c has a traffic shaper 204. The shaper 204 delays the entry of the traffic from the access LTR 202 to ensure it is compliant to a specific programmable rate and burstiness. Generally, the shaper 204 is configured to transmit traffic from the LTR 202 such that it will be compliant to either a well known single or dual leaky-bucket policing function. Packets awaiting transmission from the access LTR 202a are placed in queues 205 according to their CoS. In this example, eight CoS's are supported and each queue is used to carry one CoS. Each access LTR includes a scheduling function 206 to arbitrate which packet will be transmitted next. In this example, the scheduling function combines both a Weighted Fair Queuing (WFQ) function 206a to arbitrate between CoS-1 to CoS-6 and another hierarchy 206b that performs strict priority scheduling between CoS-0 (highest priority) and the WFQ outcome between CoS-1 to Cos-6 and CoS-7 (lowest priority). That is, as long as there is CoS-0 traffic, it will be selected for transmission. When no CoS-0 packets are awaiting transmission, the outcome of the WFQ arbitration will be transmitted. Only if no packets between CoS-1 and Cos-6 are awaiting transmission would a CoS-7 packet be transmitted (e.g., best effort). Different scheduling mechanisms and hierarchy could be implemented at that level. This implementation has advantages for supporting TDM traffic in CoS-0, since the strict priority can simply guarantee the level of performance required by this non-bursty and non-elastic application.

Another level of scheduling 207 is implemented to merge the traffic from the multiple access LTRs 202a-c. At this level, all the CoS-0 traffic from each access LTR is scheduled in sequence whenever C0s-0 traffic is available, using, for example, a simple round-robin (RR) scheduling function 207a. All the middle CoS (CoS-1 to CoS-6) traffic from all the access LTRs is arbitrated the same way by a scheduling function 207b and so is all the CoS-7 traffic by a scheduling function 207c. A third level of scheduling 208 then selects the next packet to transmit on the line based on all the packets ready to services from all the Access LTRs 208a from the outcome of the scheduling function of the previous level 207.

Transit LTRs 205 are LTRs that are transiting the system. Transit LTRs enter the system on NNI ports, and services are already mapped and merged onto them by an upstream system in the path. The traffic from a transit LTR does not need to be shaped again since its traffic has already been shaped when merged onto the LTR. In the example of FIG. 2, the traffic from the transit LTRs 205 is scheduled together using a combination of WFQ and SP scheduling functions 209 and 210.

The access LTRs 201 and the transit LTRs 205 are given access to the link based on WFQ scheduling functions 212a-c applied to the highest priority (212a), middle priority (212b) and lowest priority (212c) traffic. Each WFQ allows configuring a proportion of the link bandwidth to be split between the access and transit traffic. By configuring the weights of these WFQ schedulers 212a, 212b and 212c, it is possible to provide the transit traffic with an "express lane" to reduce the transit delay. The weights can be programmed through a system interface (SNMP, CLI) or can also be modified dynamically as connections are set up on the node by the network management or path computation engine.

The link transmission function of the egress links 101b selects the next packet to transmit on the wire based on the outcome of a strict priority scheduler 211.

Figure 3:
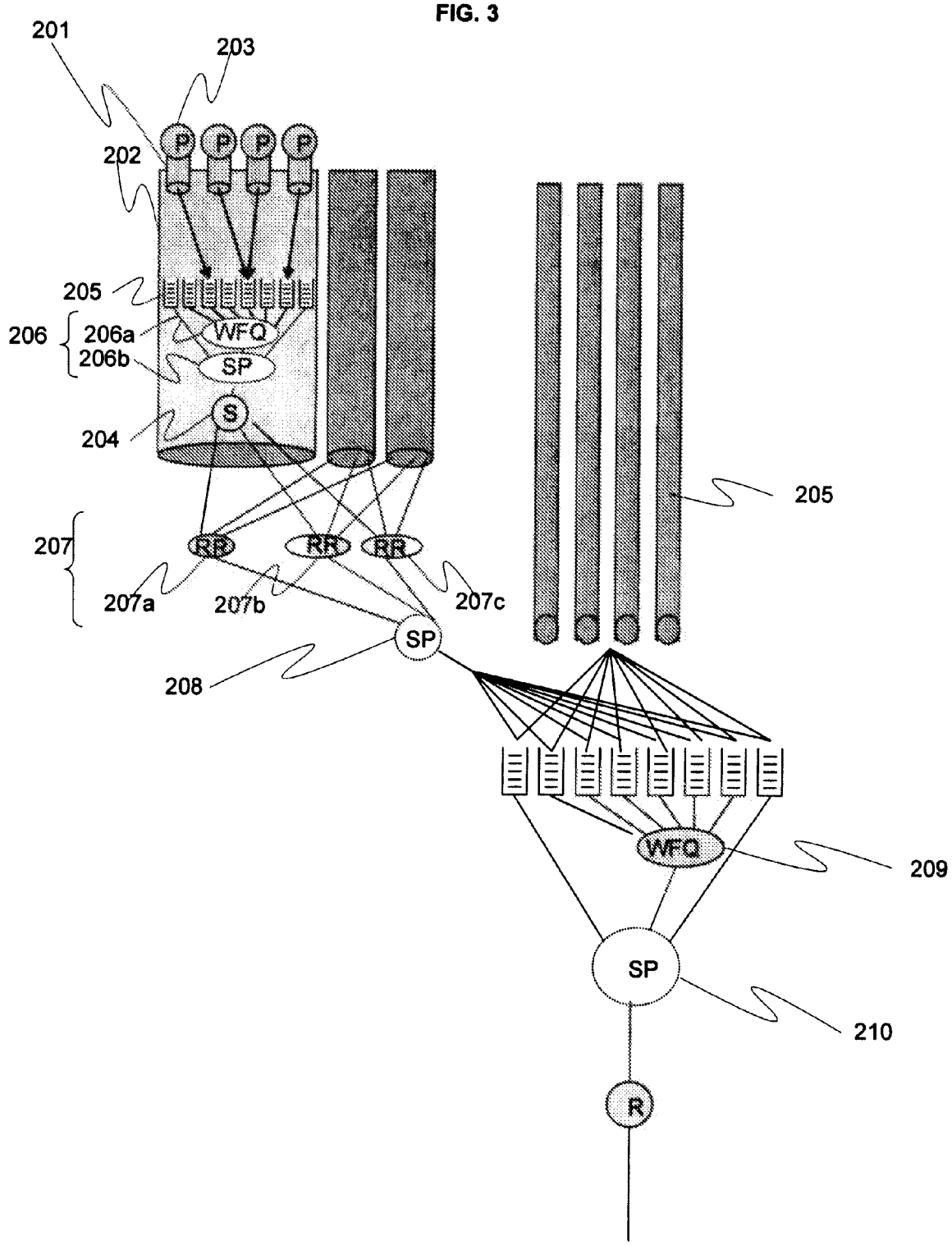
FIG. 3 is a diagrammatic illustration of another system for shaping the flow of traffic incoming from both access and transit LTRs to an egress link.

FIG. 3 provides another example of a system configured to shape access LTRs 201 and multiplex with transit LTRs 205. In this example, the access LTR traffic is scheduled along with the transit LTR traffic using the combination of a WFQ scheduling function 209 and SP scheduling 210. This configuration does not allow configuring a weight between the access and transit traffic, but has some implementation benefits, whereas the scheduling for the merged traffic can be performed on a separate line card from the shaping.

LTRs can be associated to create a protection group, where one or more LTRs act as standby for the main LTR in case of failure or maintenance. For example, the standardized Provider Backbone Bridging technology allows tunnels to be combined into protection groups for that purpose.

In a connection oriented network, protection LTRs are engineered in the network the same way as the main LTR. Therefore bandwidth is allocated for the protection LTR to ensure it is available when protection is needed. In order to reduce the amount of bandwidth stranded for protection, it is desirable to have the ability to allocate a lower amount of bandwidth for the protection LTR. However, that is only feasible if there is an ability to perform LTR shaping and to change the shaping rate to reflect the different rates of the main LTR and the backup LTR.

Figures 4A, 4B:
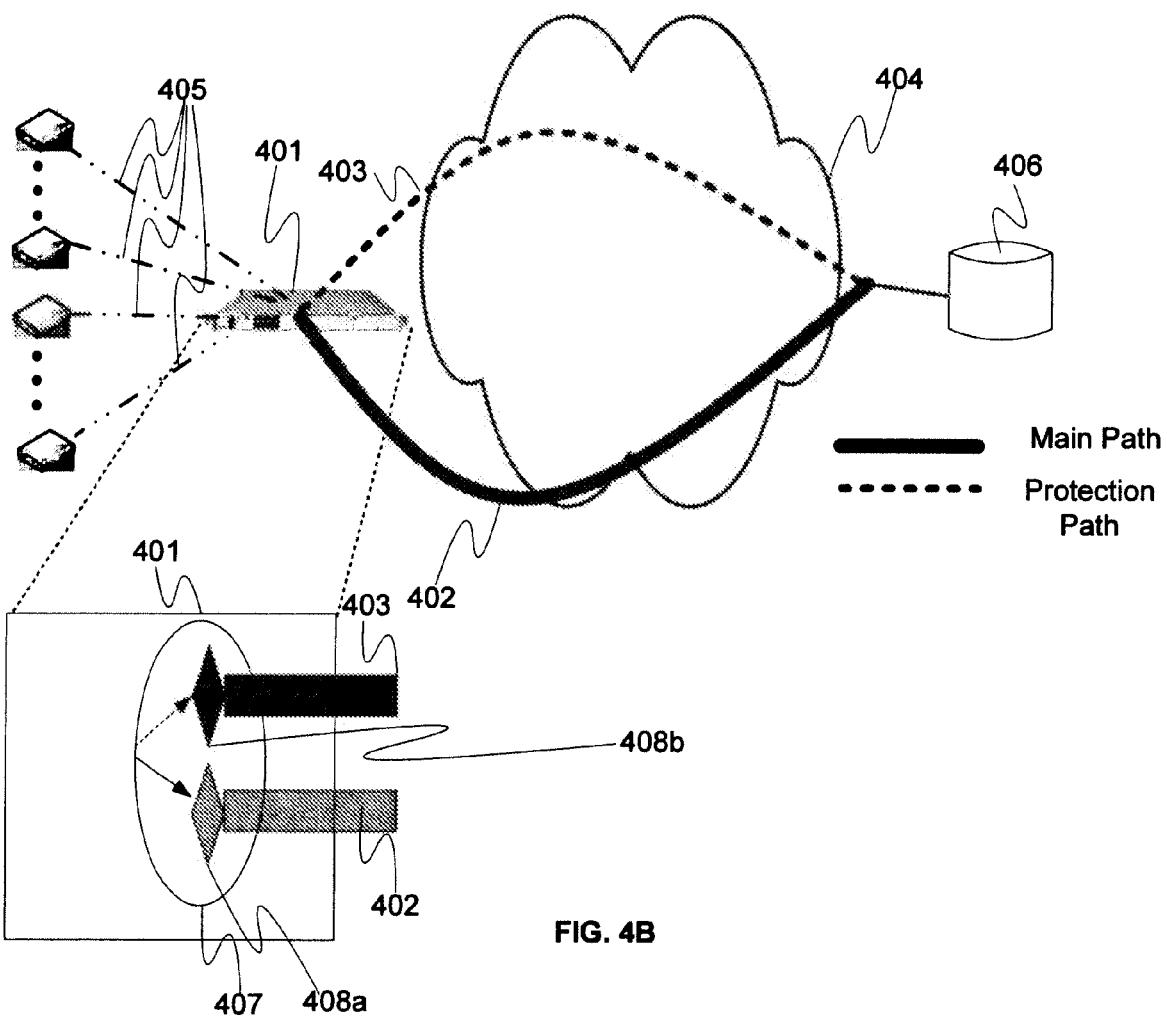
FIGS. 4A and 4B are diagrammatic illustrations of an example of an asymmetric protection path.

Referring to FIG. 4, different services 405 are merged onto an access system 401. A main LTR 402 is created to carry the traffic from these services over a network 404 to a destination 406, e.g., at a rate of 10 Mbps. A backup LTR 403 is setup using a possibly non-overlapping path in the network 404 to the same destination 406. Both LTRs are logically associated to form a protection group 407. If the system 401 is capable of shaping the LTRs, the backup path can be engineered and allocated 5 Mbps. Each LTR in the protection group can be configured with different shaper parameters 408a, 408b. This can be implemented using a different shaper resource or the same shaper with reconfigured parameters (FIG. 1B). When the switching to the protection LTR happens, the new shaping parameters immediately take effect.

The shaping function ensures that, during a protection state, the traffic from that LTR is confined to 5 Mbps and therefore excess traffic cannot affect other LTRs that are engineered on the same links as the backup path. If the LTR is not shaped and only 5 Mbps is allocated to the backup path, then the LTR can still burst to 10 Mbps even though only 5 Mbps has been allocated. Thus, 10 Mbps needs to be allocated to the main and the protection path if the LTR is not shaped.

Another benefit of using a LTR shaping function is the ability to modify the shaping parameters dynamically based on its load. A first mechanism that can be implemented using a LTR shaper is the ability of the shaper to self adjust. The objective is to meet the service performance requirement while minimizing the shaping rate. Referring to FIG. 5, a queuing mechanism similar to the one discussed above is used. The self-adjusting mechanism includes a set of queues 503, for storing packets awaiting transmission on a per-CoS basis or other policy. The queues are scheduled using a scheduling function 502, either flat or hierarchical, possibly combining one or more scheduling mechanism (e.g. WFQ, SP, RR). A queue-monitoring function (QMF) 504 monitors statistics 505 from the different queues 503. The statistics can be raw, (e.g., exceeding a queue size threshold) or a smoothed or time average of the actual queue size. Statistics can also include maximum queue size over a time period. Based on the statistics and taking into account the required quality of the services mapped onto the LTR (delay, jitter, loss), the queue-monitoring function can instruct the shaper to increase or decrease the shaper rate with the objective of limiting the possible loss or excessive delay at the LTR shaper queues. The increase and decrease information 506 can be done using levels in a predefined table of shaping rates that are confined between programmed minimum and maximum shape rates. In another implementation, the increase and decrease information 506 triggers a change in the shaper rate based on some predefined equation (e.g., multiplicative increase and substractive decrease).

As depicted in FIGS. 5B and 5C, the QMF can monitor smoothed queue size (SQS) 507 over time and use thresholds 508 to instruct the shaper on what rate 510 to use. The shaper is initialized to the maximum rate 509a for the LTR. When the SQS exceeds a threshold 512 and 513, the QMF instructs the shaper to reduce its rate to a lower level, but no lower than the minimum LTR rate 509b. When the SQS goes below a threshold 511 and 514, the QMF instructs the shaper to increase its rate to the next level. The QMF can use any number of thresholds to increase the granularity of the rate change if the shaper can adapt to multiple rates. Hysteresis can also be used for the increase and decrease thresholds to prevent changing the rate too often. In this case two thresholds are used in combination, if the SQS goes above a threshold T2, then the rate is increased, but it is only decreased when the SQS goes below a lower threshold T2'.

The QMF can also use variance measures, time-window maximum or queue growth rate to make the shaper rate decisions, or a combination of the above.

In general, the minimum shaper rate 509a should be set high enough to handle the high priority delay-sensitive services.

Using a self-adjusting shaper, the minimum rate of traffic can always be sent into the network while still meeting the required quality of service. This capability can increase the capacity of the network and simplify the network engineering.

Figure 6:
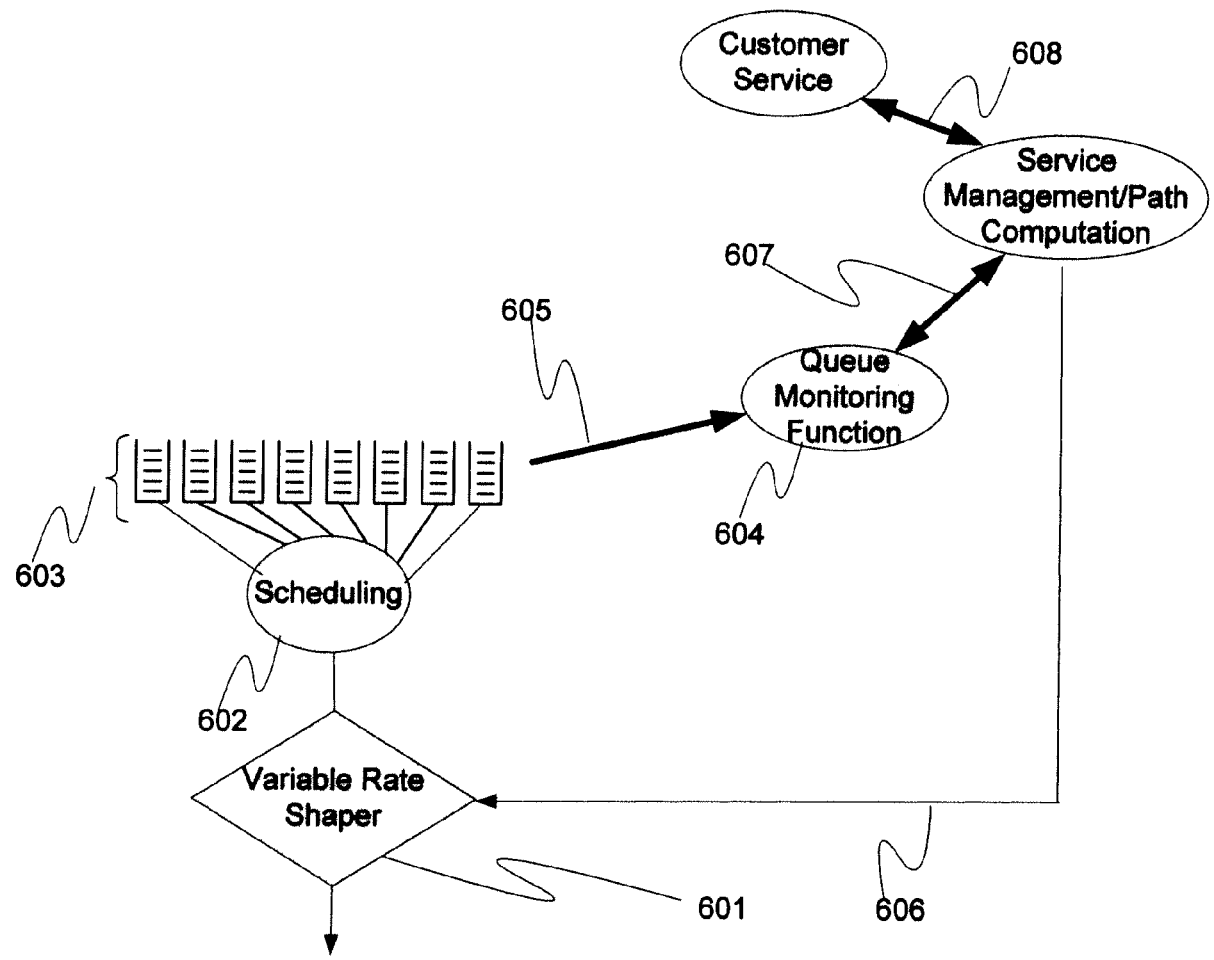
FIG. 6 is a diagrammatic illustration of a service or network management function that triggers LTR shaper rate adjustment.

When a LTR shaper is used, it is also possible to optimize the resources that the customer purchases. Referring to FIG. 6, a long term queue monitoring function (LTQMF) 604 gathers statistics 605 on the queuing behavior of queues 603 coupled to a LTR shaper 601 via scheduling function 602. The statistics 605 include a histogram of the probability of reaching a specific queue size in a given time window per classes of service. These statistics are processed and sent to a service management function and path computation function 607.

The service management function can display the information directly to the customer 608 or to the operator to provide useful insight on the usage of the LTR. Using this information, it is possible to instruct the LTR shaper 601 via control line 602 to safely increase or decrease the shaping rate to adapt to the bandwidth needs of the customer.

The path computation function also uses the information to assess whether another service of a given bandwidth profile can be added to the LTR without affecting the CoS of the existing services and the new service. Since the LTR is shaped, the path computation function only has to establish whether the service can be added onto the LTR and does not have to perform service admission further along the path.

Generally networks are engineered the same regardless of the time of day, even though the traffic patterns can differ greatly during the day and the evening. With the growth of IPTV and Video on Demand, the difference in usage between different times of day is even more dramatic. Using the LTR shaping capability, it is possible to dynamically engineer the network for different times of day to optimize the usage during the different time periods. Days are divided in one or more time periods. Weekdays, weekends and holidays can be treated differently as well to create a configurable number, n, of time periods each of which has a specific bandwidth map. The network management and path computation engine keeps one map of the network for each time period. Each time period is treated independently from a path computation and bandwidth allocation perspective based on different bandwidth profiles configured with each LTR. At the beginning of each time period, the shaping function of each LTR is adjusted according to what has been engineered for that time period.

Figure 7:
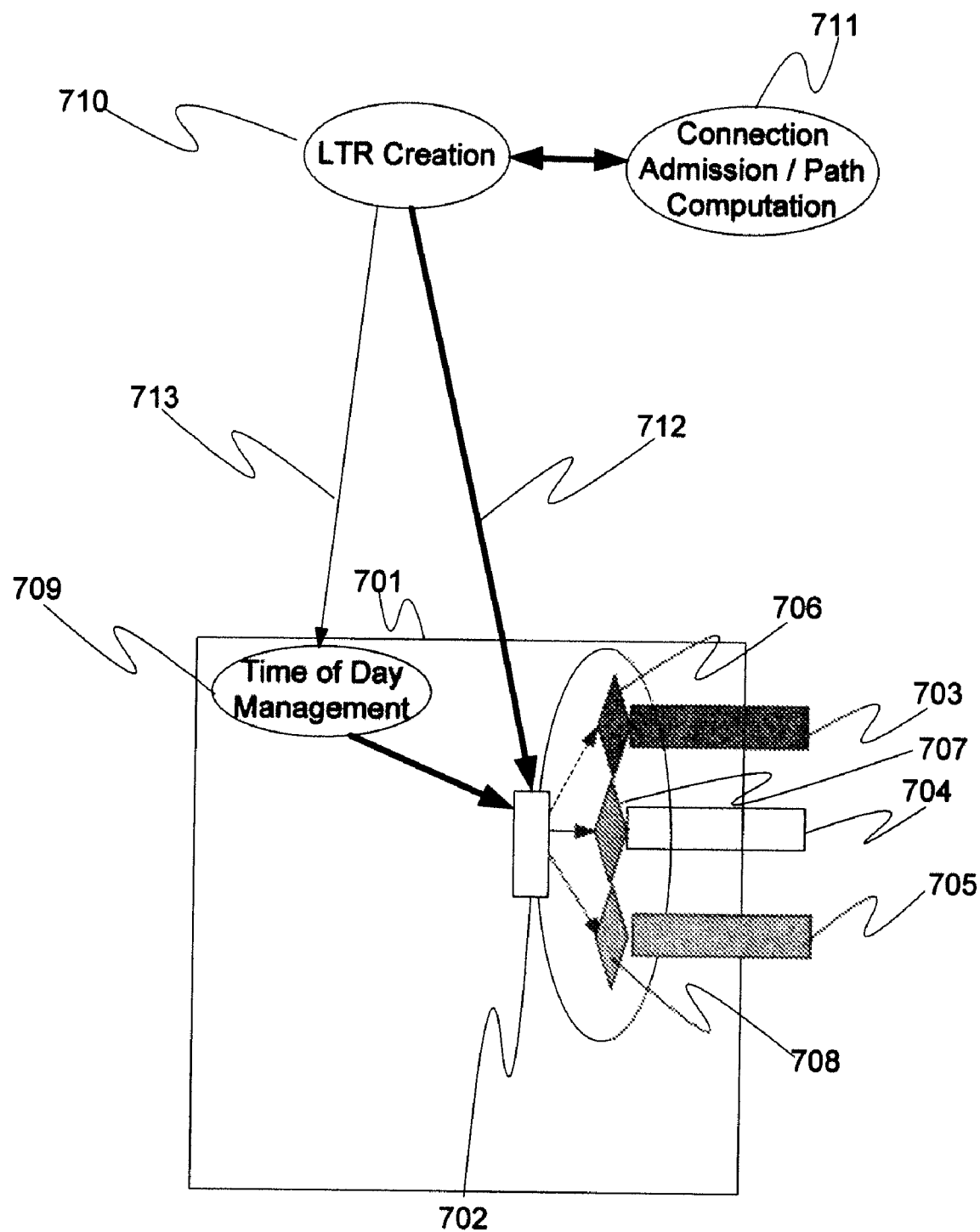
FIG. 7 is a diagrammatic illustration of an example of an egress port and associated control modules for adjusting bandwidth allocation based on time periods.

Another embodiment allows the use of different paths along with possible different rates depending on the time period. Referring to FIG. 7, when a LTR needs to be created in the network with its origination at an egress port 701 of an access node, several (up to n, where n represents the number of time periods) LTRs 703, 704, 705 are logically associated together. During any time period, one LTR acts as the active LTR and n−1 other LTRs are in standby until their respective time periods. Each of these LTRs can also be associated with a backup path in case of failure during a given time period. For each time period, a bandwidth profile $BW_i$ (i=1 to n) is defined for the $LTR_i$. A connection admission control and path computation module 711 performs the admission independently for each time period, and permits the selection of different paths. In this example, three time periods are used, and the logical LTR association includes three different paths 703, 704 and 705 with corresponding shapers 706, 707 and 708. When the time period expires, a logical association manager 702 switches to the path 703, 704 or 705 for the appropriate time period and the rate of the corresponding shaper 706, 707 or 708 is configured to reflect the bandwidth profile of the corresponding time period.

A time of day management 709 is configured with the different time periods, and instructs each logical association manager on the node to switch to the proper path at the transition to a different time of day period.

If the shapers 706-708 have the ability to receive traffic from the same queuing structure, as discussed above in connection with FIG. 1B, nothing is lost during the transition. Another option is for the traffic to be directed to the next LTRs queue when the transition happens, but the LTR shaper depletes the first queue before switching to the second queue. This implementation is suitable for non-real-time traffic.

Referring to FIG. 7, when a new LTR 701 is added to the network to reach a given source and destination, one LTR acts as the main LTR ($LTR_1$) and n−1 other LTRs are created and associated with it. Each of these LTRs can also be associated with a backup path in case of failure. For each time period, a bandwidth profile $BW_i$ (i=1 to n) is defined for the $LTR_i$. A connection admission control and path computation module 711 performs the admission independently for each time period, and permits the selection of different paths. In this example, three time periods are used, and the LTR 701 has three different paths 703, 704 and 705 with corresponding shapers 706, 707 and 708. When the time period expires, the LTR 701 switches to the path 703, 704 or 705 for the appropriate time period and the rate of the corresponding shaper 706, 707 or 708 is configured to reflect the bandwidth profile of the corresponding time period.

A time of day management 709 is configured with the different time periods, and instructs each LTR 706 to switch to the proper path at the transition to a different time of day period.

If the shapers 706-708 have the ability to point to the same queuing structure, as discussed above in connection with FIG. 1B, nothing is lost during the transition. Another option is for the traffic to be directed the other queue when the transition happens, but the LTR shaper depletes the first queue before switching to the second queue. This implementation is suitable for non-real-time traffic.

It is possible to keep all the high priority real-time sensitive traffic on a LTR that never switches paths with the time of day, while having other non-real-time sensitive traffic on a LTR that is switchable based on time of day.

An extension to this capability is specifying special, on-demand, time periods based on specific events (e.g., Mother's Day, Super Bowl). These time periods can overlap with the other regular time periods and can override them temporarily. When an on-demand time period is set up, another parallel map of the network capacity is defined, and the path computation adjusts the capacity for the specific services and moves paths as required.

Significant bandwidth savings can be achieved with this capability since the network can be safely engineered for the different applications proportions during the different time periods.

Figure 8:
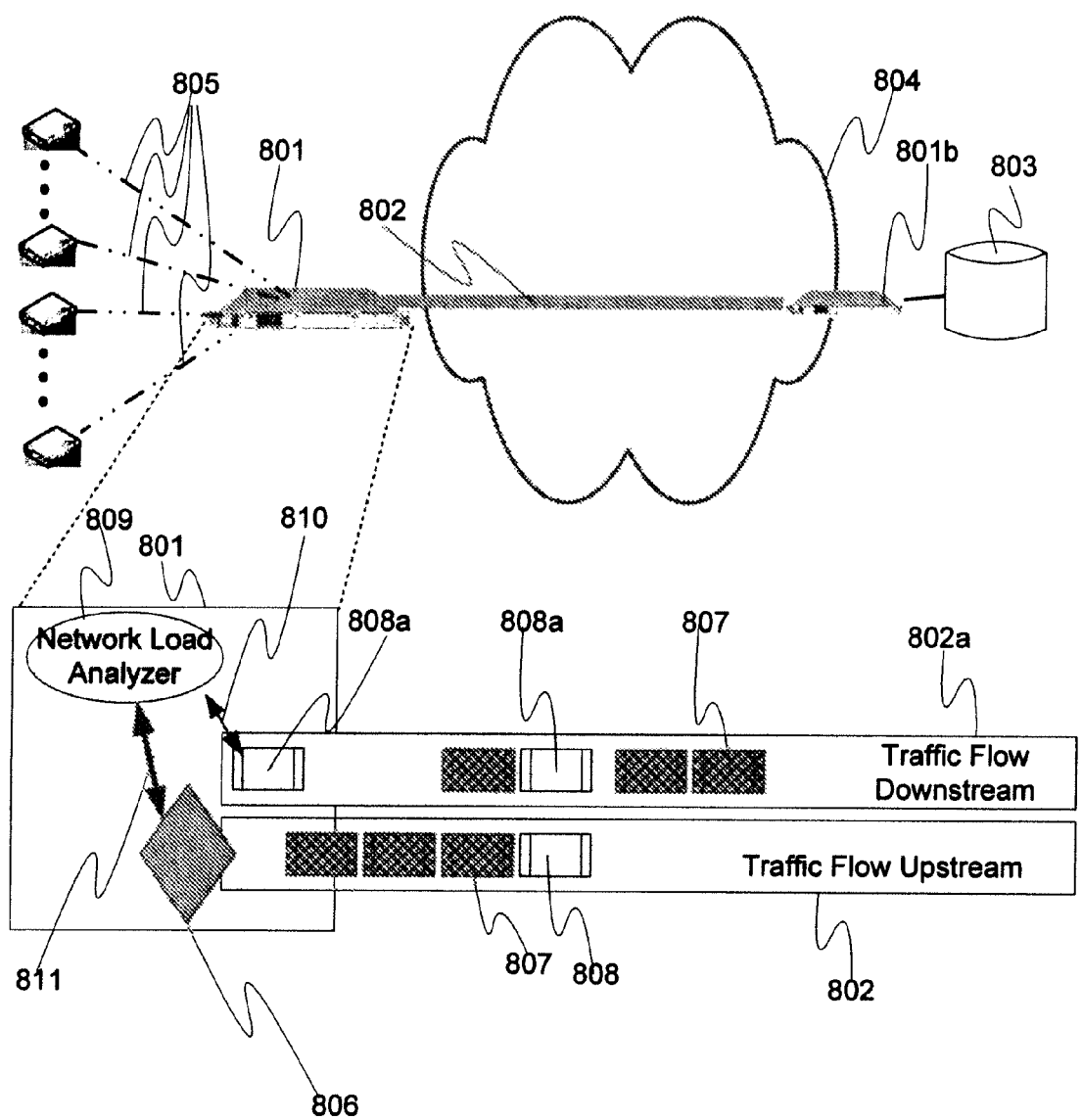
FIG. 8 is a diagrammatic illustration of an example of a LTR shaper that adapts its rate based on load information gathered in real time from the network.

Referring to FIGS. 8A and 8B, a system 801 is located at the edge of a network 804. The system 801 aggregates traffic from one or more services 805. The traffic from these services is destined for an application server 803 located across the network 804. To carry the traffic, a LTR 802 is created. The LTR contains the traffic from the different services 805. It is shaped using a LTR shaper 806 within the system 801. Time-stamped control messages 808 are inserted periodically within the data flow of the LTR. These control messages 808 can be the same as the ITU-T Y.1731 Continuity Check Messages (CCM) used to verify connectivity. Once received at a destination access system 801b, the control message is time-stamped, turned around and inserted as a message 808a in the return (backward) direction of the connection along with traffic 807 going in the upstream direction. The returned control message 808a is sent to a network load analyzer (NLA) function 809. The i-th returned control message includes the creation time-stamp ($CTS_i$) and the return time-stamp ($RTS_i$). The NLA calculates the one-way forward delay ($FD_i$) of the i-th control message using the CTS and RTS:

$$FD_i = RTS_i - CTS_i + \xi_i$$

Because the clocks of the end systems 801a, 801b are not synchronized, there can be a clocking error $\xi_i$ in the forward delay calculation. However, the intent is to estimate the trend in the forward delay to evaluate an increase in the load in the path, and as such a differential delay ($DD_i$) can be calculated between two consecutive forward delay measurements ($FD_i$ and $FD_{i-1}$), eliminating most of the error incurred by the clock differences because the clock drift is slow and negligible compared to the delay incurred by an onset of congestion in a queue in the path.

$$DD_i = FD_i - FD_{i-1} = RTS_i - CTS_i + \xi_i - (RTS_{i-1} - CTS_{i-1} + \xi_{i-1})$$

A positive $DD_i$ indicates an increase in delay from the previous measurement. A near zero DD indicates that the load on the path remains unchanged, and a negative DD indicates that the queues are recessing. The value of the RTS can be smoothed to avoid reacting to spikes of delay.

Similarly the value of the DD can be smoothed over a short period of time.

When the value of DD exceeds a configured value, the rate of the LTR shaper is reduced, stepwise, but not lower than a configurable minimum. The step can be linear or multiplicative. When the value of the DD is near zero for a configurable number of measurement periods and the shaper rate is still lower than its maximum, the shaper rate is increased by one step, but no higher than a configured maximum. In some implementations, the shaper rate may remain unmodified if the DD is near zero as it indicates queue stability. The step can be linear or multiplicative, but not necessarily the same as the decrease steps. If the DD is below zero and the shaper is lower than its configured maximum, the shaper rate is increased by one step, but no higher than a configured maximum. In the case of several DDs consecutively below zero, the step is optionally changed to a more aggressive increase.

By measuring delay difference, it is also possible to track changes in the speed of adaptive wireless links deployed in the mobile backhaul. The DD value will immediately change when the wireless link adapts to a new rate, and the LTR shaper rate will adapt accordingly.

Figure 9:
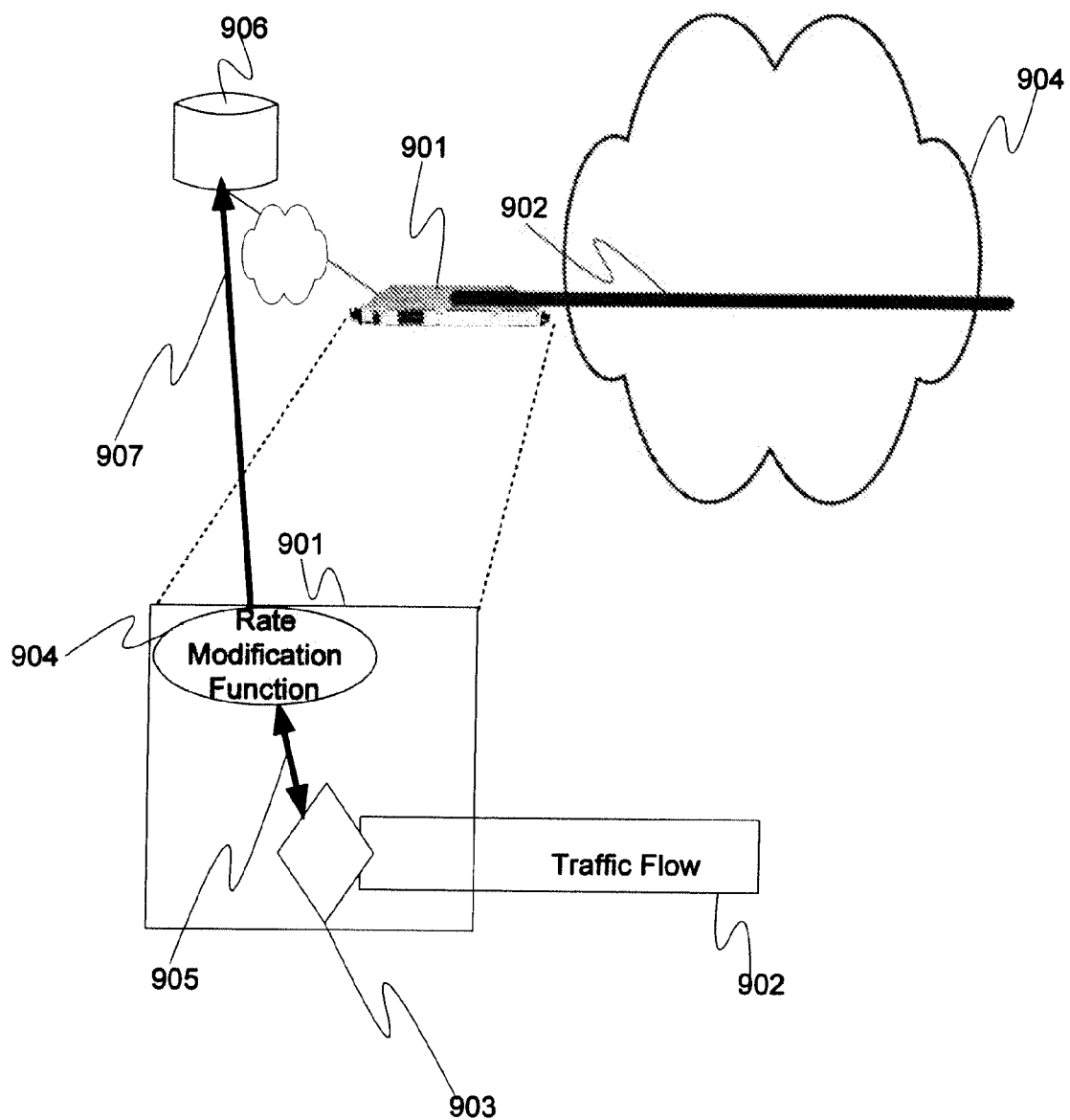
FIG. 9 is a diagrammatic illustration of an example of a variable LTR shaper that provides information to a session management in a services delivery point to adapt the application load.

Referring now to FIG. 9, a network 904 is equipped with systems 901 that have the ability to create and shape LTRs 902 at its edge. The LTR shaper rate can be fixed, or variable or can change when a protection LTR is used (asymmetric protection), depending on the capability of the LTR shaper and the system. The LTR shaper performs monitoring of the state of its queues. When a threshold is exceeded by at least one of the queue size, the smoothed queue size or a queue growth measurement for at least one of the queues, a, rate modification function (RMF) 904 instructs an application 906 to stop admitting new sessions (e.g. adding a Video on Demand session). When a second threshold is reached for at least one of the parameters, the RMF instructs the session controller of the application 906 to terminate existing sessions of lower priority or lower quality. When the measured parameter(s) reduce back to the second threshold, the RMF configurably instructs the session controller to reinstate the lower quality sessions that were terminated. When the first threshold is reached, the RMF instructs the session controller to resume admitting new sessions. Hysteresis can be applied to the thresholds to avoid changing state too rapidly.

The information provided by the RMF can also be used to configure the right size LTR for carrying the sessions.

Figure 10:
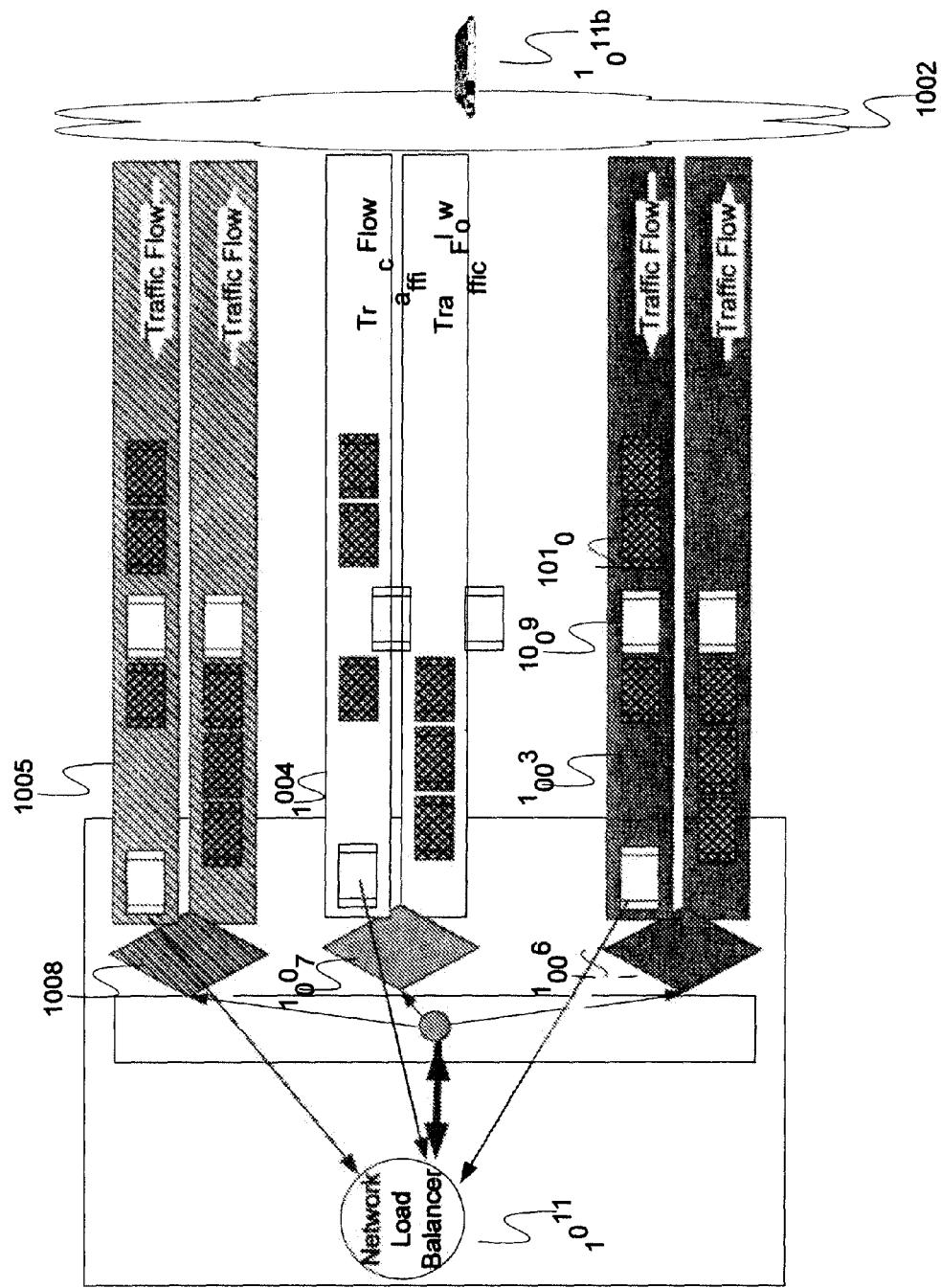
FIG. 10 is a diagrammatic illustration of a network edge system that aggregates traffic from one or more services onto a main LTR.

Referring to FIG. 10, a system 1001 located at the edge of a network 1002 aggregates traffic from one or more services onto a main LTR 1003. One or more alternative LTRs 1004, 1005 are associated with the main LTR. The LTRs are shaped using respective LTR shapers 1006, 1007 and 1008. Control messages 1009 with a time-stamp (CTS) are periodically inserted in each LTR (main 1003 and alternatives 1004, 1005). These control messages 1009 can be the same as the ITU-T Y.1731 Continuity Check Messages (CCM) used to verify connectivity. Once received at the destination access system 1001b, the control message still carries the initial time-stamp (CTS) and is time-stamped (RTS) before being turned around and inserted as a message in the return (backward) direction of the connection along with the traffic 1010 going in the upstream direction. The returned control message is sent to a network load balancer (NLB) function 1011 that evaluates the delay on each of the main and alternative paths associated with the LTR. The NLB calculates the one-way forward delay ($FD_i$) of the i-th control message using the CTS and RTS:

$$FD_i = RTS_i - CTS_i + \xi_i$$

If the average FD measurement over a programmable number of time periods is greater than the delay measurement on at least one of the alternative paths by at least programmable threshold, the LTR switches to the alternative path with the lower delay. If the same queuing structure is used for all the paths, the switch can be done without loss (as discussed above), or the new traffic can be directed to the new main LTR, while the main LTR empties the buffers.

In another embodiment, if the average FD measurement over a programmable number of time periods exceeds a programmable threshold, the LTR switches to the alternative path with the lower delay, which then becomes the new main path. The previous main path becomes an alternative path associated with the new main path.

Optionally, the system can revert automatically or manually to the initial main path when its FD measurement recesses below a programmable threshold.

If the same queuing structure is used for all the paths, the switch can be done without loss (as discussed above), or the new traffic can be directed to the new main LTR while the main LTR empties the buffers.

If more than one alternative path is available for the LTR, priorities can be assigned to the alternative paths, and the main LTR will switch to the highest priority path with a lower delay before using a lower priority path.

The delay difference function ($DD_i = FD_i - FD_{i-1}$) described above, can be used instead of the FD measurement to trigger the LTR switching.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A method of managing data packets passing through an Ethernet node, said method comprising
operating said node, said node comprising multiple ingress ports and multiple egress ports, said ingress ports receiving said data packets from at least one services, said egress ports configured with at least one Logical Transport Resource (LTR), each of said at least one LTR configured as a predefined path between one of said egress ports and a destination in the Ethernet network, and wherein said at least one LTR between network-network interface ports,
mapping one or more of said services to each of said at least one LTR, wherein said one or more services are incoming on one or more user-network interface ports,
dynamically modifying each of said at least one LTR to a configured rate, wherein said dynamically modifying comprises shaping performed at the node on access traffic and scheduling at the node on said access traffic and transit traffic with each of said access traffic and said transit traffic configured to egress at the configured rate for the at least one LTR through the Ethernet network, and wherein said scheduling is performed through a hierarchical structure on said access traffic of said node and said transit traffic of said node, and
transmitting data packets to the Ethernet network via said egress ports.

2. The method of claim 1 further comprising multiple LTRs configured to a selected one of said egress ports, and multiplexing the data packets on the multiple LTRs configured to the same egress port for transmitting data packets from said selected egress port to said destination in the Ethernet network.

3. The method of claim 2 wherein said multiplexing provides configurable priority for data packets that are already in said LTRs as compared to traffic newly entering said LTRs.

4. The method of claim 2 wherein at least two of said LTRs are associated together, and said dynamically modifying is configurably directed to one of said associated LTRs at a time.

5. The method of claim 4 wherein said associated LTRs have different paths to the same destination.

6. The method of claim 4 wherein said associated LTRs have non-overlapping paths to the same destination.

7. The method of claim 4 wherein all the associated LTRs use the same queuing and scheduling.

8. The method of claim 4 further comprising switching data packets from a first of said associated LTRs to a second of said associated LTRs, but scheduling and activating said second LTR only when no data packets remain queued to said first LTR.

9. The method of claim 4 further comprising:
estimating the performance of each of the paths of said associated LTRs, and
dynamically switching from a first of said associated LTRs to a second of said associated LTRs when the performance of said first LTR is degraded compared to the performance of said second LTR, with said first LTR becoming an associated LTR for said second LTR.

10. The method of claim 9 wherein said first LTR is the main LTR prior to said dynamic switching, and said second LTR is the main LTR after said dynamic switching.

11. The method of claim 4 wherein said associated LTRs include a main LTR and a protection LTR, said protection LTR having a configurably lower rate than said main LTR.

12. The method of claim 1 wherein said dynamically modifying comprises:
queuing the incoming data packets in one of multiple queues associated to said at least one LTR according to a class of service identifier, and
scheduling the exiting of said data packets from said queues according to a queue priority at a configured LTR shaping rate.

13. The method of claim 12 wherein said ingress ports receive data packets from multiple services, and said scheduling applies priorities for the different classes of service according to a predetermined hierarchy.

14. The method of claim 12 wherein said scheduling provides at least one strict priority scheduling in which a preselected class of service has the highest priority.

15. The method of claim 14 wherein said preselected class of service that has the highest priority includes Time Division Multiplexed (TDM) traffic.

16. The method of claim 1 further comprising dynamically modifying said configured rate on the basis of the load in the LTR being shaped.

17. The method of claim 16 wherein said at least one LTR includes at least one associated queue, and which includes measuring the size of said associated queue and dynamically modifying said configured rate when the measured size of said at least one associated queue passes a predetermined threshold.

18. The method of claim 16 wherein said configured rate is maintained between a configurable minimum and a configurable maximum.

19. The method of claim 1 wherein said at least one LTR includes at least one associated queue, and which includes providing information regarding the load of said at least one associated queue to a management system, and manually adjusting the rate of said configured rate based on said information.

20. The method of claim 1 further comprising dynamically modifying said configured rate on the basis of a time period.

21. The method of claim 1 in which said at least one LTR comprises multiple LTRs providing each of which is configured as a different predefined paths between a selected one of said egress ports and a destination in the Ethernet network, and further comprising:
transmitting data packets from said selected egress port to said destination via different ones of said LTRs in different time periods, and
dynamically modifying said multiple LTRs to different configured rates.

22. The method of claim 1 further comprising dynamically modifying said at least one LTR to a different configured rate in different time periods.

23. The method of claim 1 further comprising estimating the traffic load on said Ethernet network based on control messages, and dynamically modifying said configured rate on the basis of the estimated traffic load.

24. The method of claim 23 wherein the traffic load on said Ethernet network is estimated by calculating the forward delay in transmitting a control packet between a pair of nodes in said Ethernet network, and calculating a differential between two consecutive forward delay calculations.

25. The method of claim 1 further comprising:
queuing the incoming data packets in one of multiple queues associated to said at least one LTR according to a class of service identifier,
monitoring the load of said queues, and
notifying applications using the service of the status of the monitored load of said queues such that said applications can dynamically adapt their transmission load to the available bandwidth.

26. An Ethernet node, comprising:
ingress ports receiving data packets from at least one service, said ingress ports comprising user-network interface ports;
egress ports comprising network-network interface ports, said egress ports configured with at least one Logical Transport Resource (LTR), each of said at least one LTR configured as a predefined path between one of said egress ports and a network-network interface port on a destination in an Ethernet network; and
a traffic modification mechanism configured to shape and schedule said data packets over the at least one LTR to a predetermined rate, wherein the traffic modification mechanism is configured to operate at various ports associated with the at least one LTR, wherein the traffic modification mechanism configured to operate on both access data packets and transit data packets concurrently at the Ethernet node, wherein said traffic modification mechanism configured to:
shape the data packets via delaying entry of the data packets from an access point to ensure compliance to a specific programmable rate and burstiness; and
schedule the data packets for the at least one LTR to remove burstiness either generated by one service or resulting from merging of the at least one service onto the at least one LTR, wherein said to schedule comprises utilizing a plurality of scheduling functions comprising a plurality of hierarchical levels of scheduling.

27. An Ethernet node, comprising:
a plurality of ports comprising one or more access Logical Transport Resources (LTRs), at least one transit LTR, and an egress LTR; and
a plurality of functions configured dynamically modify a rate of data packets from the one or more access LTRs and the at least of transit LTR to the egress LTR, said plurality of functions comprising:
a policing function for services mapped to the one or more access LTRs;
a shaping function for the services mapped to the one or more access LTRs;
a first hierarchical scheduling function coupled to the shaping function for the service mapped to the one or more access LTRs;
a second hierarchical scheduling function for services mapped to the at least one transit LTR; and
a third hierarchical scheduling function receiving services from the first hierarchical scheduling function and the second hierarchical scheduling function, wherein the egress LTR is configured to receive services from the third hierarchical scheduling function, and wherein each of the plurality of functions is configured to collectively manage the rate of data packets data packets on the egress LTR;
wherein the plurality of functions collectivity operate on both data packets from the one or more access LTRs and the at least of transit LTR at the Ethernet node.

* * * * *